May 24, 1966  R. E. BUCK  3,252,710
POWER CHUCK

Filed Dec. 23, 1963  2 Sheets-Sheet 1

INVENTOR.
RUSSELL E. BUCK
BY Woodhams, Blanchard and Flynn
ATTORNEYS

May 24, 1966  R. E. BUCK  3,252,710
POWER CHUCK

Filed Dec. 23, 1963  2 Sheets-Sheet 2

INVENTOR.
RUSSELL E. BUCK
BY
Woodhams, Blanchard & Flynn
ATTORNEYS

United States Patent Office 3,252,710
Patented May 24, 1966

3,252,710
POWER CHUCK
Russell E. Buck, Scotts, Mich., assignor to Buck Tool Company, Kalamazoo, Mich., a corporation of Michigan
Filed Dec. 23, 1963, Ser. No. 332,656
9 Claims. (Cl. 279—121)

This invention relates to a chuck construction and it relates more particularly to a drawbar operated chuck having jaws movable at an angle of less than 90 degrees to the direction of drawbar movement.

In a drawbar operated chuck, the point of applying power to pull the chuck jaws radially inwardly is necessarily spaced axially a short distance from the area at which the jaws engage the work. Thus, when the drawbar of a conventional chuck having strictly radially movable jaws pulls said jaws inwardly, there is a couple applied to each of the jaws tending to rotate it in a direction such that the radially inner portion of the jaw has a component of motion away from the chuck face. When this occurs, the workpiece being grasped by the jaws may also be moved away from the chuck face by, for example, several thousandths of an inch. Such malpositioning will often lead to an incorrectly machined workpiece. This effect is worsened because it increases in a generally unpredictable manner with an increase in drawbar pull and with increased axial looseness in the jaw mounting due to normal wear. In addition to the above-mentioned effects, it will be recognized that the various jaws in a multiple jaw chuck will move different distances axially when subjected to a given drawbar pull with the result that a workpiece gripped by such jaws may be cocked with respect to the axis of the chuck leading to further and, in some instances, more serious errors in the machining of the workpiece.

Hence, the objects of this invention include:

(1) To provide a chuck construction capable of assuring solid seating of a workpiece against the guiding face of the chuck when the jaws are engaging or have engaged the workpiece.

(2) To provide a chuck construction, as aforesaid, including jaws capable of gripping a workpiece and movable at an angle of less than 90 degrees with respect to the central axis of the chuck whereby when said jaws are moved radially inwardly to grip a workpiece said jaws urge said workpiece rearwardly into firm contact with the guiding face of the chuck.

(3) To provide a chuck construction, as aforesaid, including means defining a straight-line path for each jaw and further including means supplementing said path defining means at the inner ends of said jaws.

(4) To provide a chuck construction, as aforesaid, in which the friction to be overcome by the drawbar in moving the jaws is reduced significantly.

(5) To provide a chuck construction, as aforesaid, wherein the radial force upon the workpiece required to resist torque loads applied to the workpiece is reduced thus reducing the risk of wall deflection or surface damage in the workpiece, said radial force reduction being made possible by increased friction between the end of the workpiece and the guiding face of the chuck.

(6) To provide a chuck construction, as aforesaid, having an increased length thereof supporting the jaw carriers for giving improved support and guidance of the jaws by the chuck.

(7) To provide a chuck construction, as aforesaid, having increased contact area between the jaw carriers and the drawbar assembly for decreasing contact pressures therebetween.

(8) To provide a chuck construction, as aforesaid, providing means uniformly limiting the radially inward travel of the jaws.

(9) To provide a chuck construction, as aforesaid, which is relatively inexpensive to manufacture, which requires no operator retraining for its use, which is easily maintained and which is capable of a long service life with a minimum of maintenance.

Other objects and purposes of this invention will be apparent to persons acquainted with devices of this type upon reading the following specification and upon examining the accompanying drawings.

Figure 3:
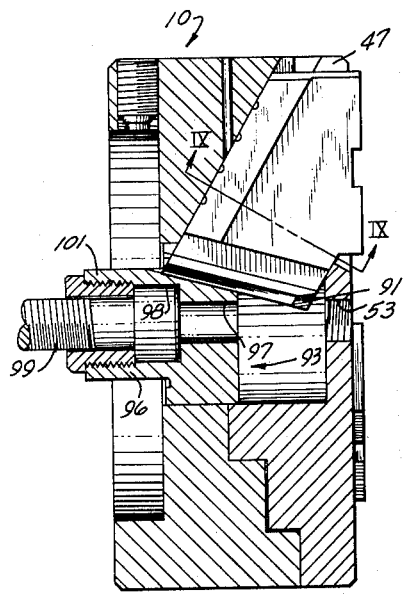
FIGURE 3 is a view similar to FIGURE 2 but showing the chuck jaw carrier in a position corresponding to the closed jaw position.
Figure 4:
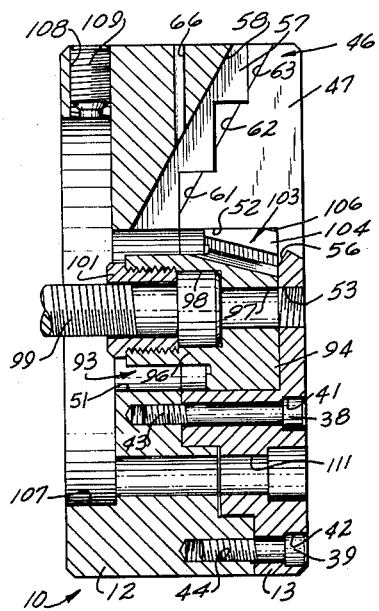
FIGURE 4 is a cross-sectional view essentially as taken on the line IV—IV of FIGURE 1 and with the jaw carrier removed.

The following description will utilize certain terms for convenience in reference only, which terms are neither believed nor intended to be limiting. For example, the words "forwardly" and "rearwardly" will refer to directions to the right and left, respectively, in FIGURES 2, 3 and 4. The words "rightwardly," "leftwardly," "upwardly" and "downwardly" will refer to directions in the particular figures to which reference is made. The words "inwardly" and "outwardly" will refer to directions toward and away from, respectively, the geometric center of the chuck. Said terms will include the words above specifically mentioned, derivatives thereof and words of similar import.

*General description*

Generally, the objects and purposes of this invention are met by providing a chuck including a chuck body comprising a conically related front plate and back plate. The chuck body includes guide means aligned according to said conical relationship for supporting a plurality of jaw carriers for simultaneous radially inward and axially rearward movement thereof. A drawbar actuated drive member has drive surfaces acting as wedges upon said jaw carriers for urging said jaw carriers radially inwardly as said drive member is moved rearwardly. A workpiece gripped by jaw assemblies including said jaw carriers is thus moved rearwardly toward said chuck as it is being gripped by said jaw assemblies thereby assuring a snug fit between the workpiece and stop means fixed with respect to the forward face of the chuck.

*Detailed description*

Figure 1:
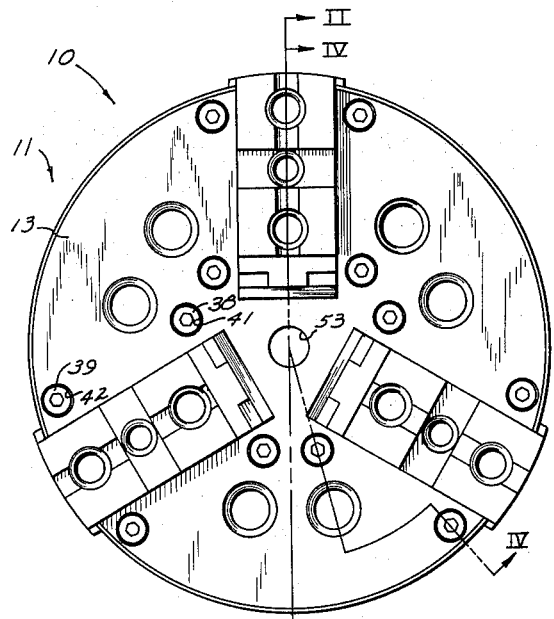
FIGURE 1 is a front view of a chuck embodying the invention and showing the workpiece receiving face thereof.
Figure 2:
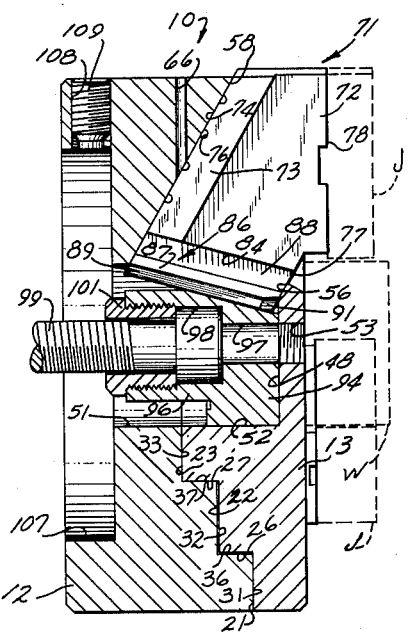
FIGURE 2 is a central cross-sectional view essentially as taken along the line II—II of FIGURE 1 and showing a chuck jaw carrier in a position corresponding to the open jaw position.

Referring now to FIGURES 1 and 2, a chuck 10 embodying the invention includes a generally cylindrical chuck body 11 comprising a back plate 12 and a front plate 13. The front plate 13 and back plate 12 are generally conically related, the front plate 13 having a convex rear face receivable into the concave front face of the back plate 12. Said front and rear faces may be truly cone-shaped or may be, as in the embodiment shown, a stepped approximation to a cone, the step configuration simplifying machining under certain circumstances. The number of steps employed may be varied according to need. Typically, larger chucks will have more steps than smaller chucks. In the particular embodiment shown, three steps are provided. Thus, the front plate 13 has three annular, rearwardly facing surfaces 21, 22 and 23, as sequenced radially inwardly and axially rearwardly. These rearward surfaces are axially displaced from each other by coaxial inner and outer cylindrical surfaces 26 and 27, respectively. The back plate 12 has three annular, axially displaced, forwardly facing surfaces 31, 32 and 33 corresponding to the surfaces 21, 22 and 23, respectively. Secure attachment of said front and back plates does not require contact between all of the opposed radial surfaces of said plates. Satisfactory assembly of the chuck body 11 is obtained with, for example, only the innermost and outermost radial surfaces, i.e., the surfaces 23 and 33 and the surfaces 21 and 31 in contact. The back plate 12 also has a pair of circumferential surfaces 36 and 37 connecting the radial surfaces 31, 32 and 33. Only one of the circumferential surfaces 36 and 37, here 37, need contact the corresponding circumferential surface 26 or 27, here 27, for piloting the front plate 13 into the back plate 12 to insure concentricity of the parts of the assembled chuck body 11. Machining of the surfaces 22, 32, 26 and 36 is thus made considerably less critical.

An inner ring of screws 38 and an outer ring of screws 39 (FIGURES 1 and 4) extend through preferably countersunk holes 41 and 42, respectively, in the front plate 13 and threadedly engage preferably blind holes 43 and 44, respectively, in the back plate 12. The blind holes 43 and 44 (FIGURE 5) are preferably located in radial surfaces 33 and 31, respectively.

The back plate 12 has a central opening 51 (FIGURE 4) therethrough and the front plate 13 has a rearwardly opening central recess 52 therein constituting a linear extension of the central opening 51. An access hole 53 coaxial with the recess 52 communicates therefrom through the front face of the front plate 13. If desired, the opening 53 may be tapped for insertion thereinto of a suitable plug (not shown) for protecting the inside of the chuck against dirt.

Figure 6:
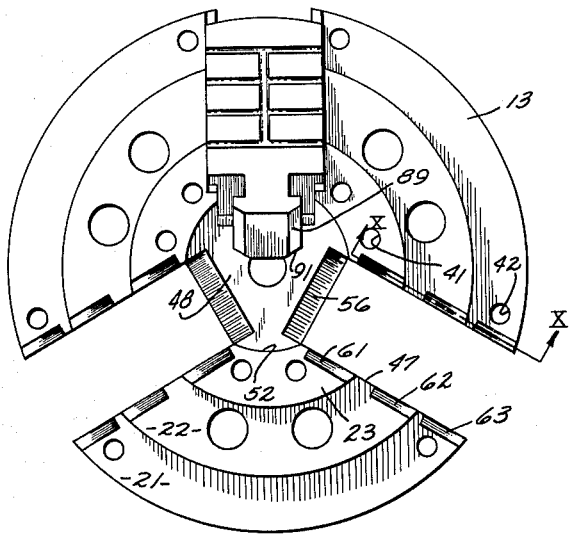
FIGURE 6 is a rear elevational view of the front plate of the chuck of FIGURE 1 with a jaw carrier in place thereon.

The chuck body 11 includes a plurality, here three, of circumferentially spaced guideways 46 each of T-shaped cross section transverse to its longitudinal axis. The longitudinal axis of each guideway 46 is inclined rearwardly as it runs radially inwardly. In the embodiment shown, the guideways 46 are inclined at about 60 degrees to the chuck axis. Each of the guideways 46 opens at one end through the circumferential wall and forward face of the chuck body 11 and opens at the other end thereof into the central opening 51 and central recess 52. Thus, the portion of each guideway 46 located in the front plate 13 (FIGURES 4 and 6) comprises a parallel walled slot 47 extending axially therethrough and extending radially inwardly thereinto sufficiently to communicate with the central recess 52. The forward end 48 of the central recess 52 has at each slot 47 a chamfered surface 56 sloping radially inwardly and rearwardly in a direction parallel to the longitudinal axis of the guideway 46. The slot 47 defines the leg portion of the T-shaped cross section characterizing each guideway 46.

Figure 10:
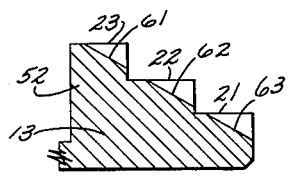
FIGURE 10 is a sectional view essentially taken on the line X—X of FIGURE 6.
Figure 9:
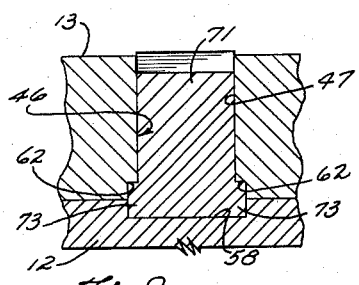
FIGURE 9 is a sectional view essentially taken on the line IX—IX of FIGURE 3.

The portion of each guideway 46 located in the back plate 12 comprises a groove 57 (FIGURES 4 and 5), including a ramp surface 58, of width greater than the width of the corresponding slot 47 and has walls parallel to the longitudinal axis of the corresponding guideway 46. The ramp 58 is thus parallel with the corresponding chamfered surface 56 when the chuck body 11 is assembled as in FIGURE 4. The rearward face of the front plate 13 (FIGURES 4, 6 and 10) is preferably relieved along the edges of each slot 47 to form a sloped, outwardly and rearwardly facing ledge surface or surfaces such as the surfaces 61, 62 and 63 on each side of the slot 47. In the assembled chuck body 11 (FIGURES 4 and 9) the ledge surfaces 61, 62 and 63 are forwardly spaced from and parallel to the ramp 58 and extend sidewardly to the edge of the groove 57 to define therewith the crosshead portion of the T-shaped cross section of the guideway 46. The intermediate portion of the ramp 58 communicates with the outer circumferential wall of the back plate 12 through a lubrication passage 66. The slope of the ramp 58 allows the lubrication passage 66 to be a simple, straight hole.

Figure 5:
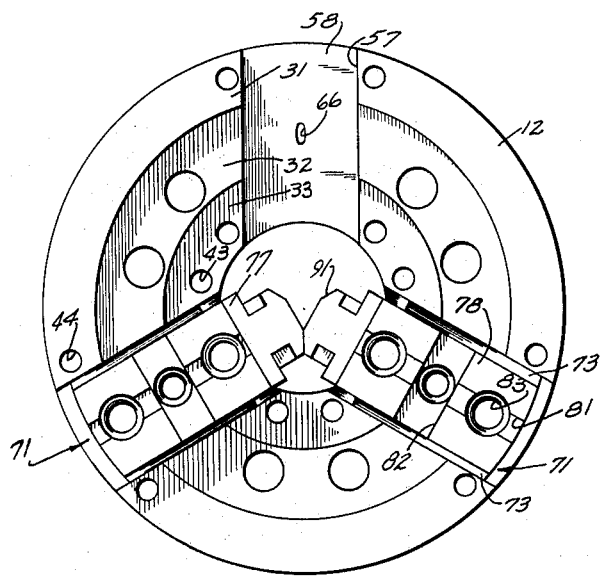
FIGURE 5 is a front elevational view of the back plate of the chuck of FIGURE 1 with two jaw carriers in place thereon.
Figure 7:
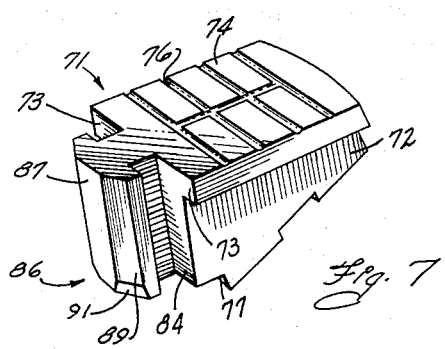
FIGURE 7 is a perspective view of a jaw carrier of the chuck of FIGURE 1.

The chuck 10 further includes a plurality, here three, of preferably identical jaw carriers 71. Each jaw carrier 71 has a body portion 72 (FIGURE 7) and a pair of parallel guide flanges 73 on opposite sides of said body portion 72 and extending the length thereof. Said body portion 72 and guide flanges 73 define a generally T-shaped cross section transverse to the longitudinal axis of said jaw carrier 71. The guide flanges 73 define with the body portion 72 an essentially flat riding face 74 which in this embodiment is crossed by a connected, parallel series of lubrication grooves 76. The width of each jaw carrier 71 across the guide flanges 73 is preferably slightly less than the width of the grooves 57 in the back plate 12. Thus, said jaw carriers 71 may each be inserted into one of said grooves 57 with the riding surface 74 slidably contacting the ramp 58 (FIGURES 2 and 5). In this position, the lubrication grooves 76 in the jaw carrier 71 cooperate with the lubrication passage 66 in the groove 57 to facilitate sliding motion of the jaw carrier 71 along the groove 57. The thickness of the guide flanges 73 is preferably sufficient to provide a clearance fit thereof between the ramp 58 and the plane defined by the ledge surfaces 61, 62 and 63 (FIGURE 4) in the assembled chuck 10 and the jaw carrier body portion 72 is preferably sufficiently wide as to provide a clearance fit thereof within the slot 47. The jaw carrier 71 has at its radially inner end a sloped supplementary guide surface 77 which is parallel to and faces oppositely from the riding face 74. The riding face 74 and guide surface 77 are preferably spaced to provide a clearance fit thereof between the ramp 58 and chamfered surface 56. The guide surface 77, when the chuck 10 is assembled, is in snug but sliding contact with the chamfered surface 56 for providing additional bearing area preventing forward movement of the radially inner end of the jaw carrier 71.

Thus, with the chuck body 11 assembled, the jaw carriers 71 are constrained to move only along the longitudinal axis of the guideways 46. In this embodiment, the jaw carriers 71 are so constrained by the ramp 58, ledge surfaces 61, 62 and 63, the side walls of the slot 47 and the chamfered surface 56.

The front face 78 of the jaw carrier 71 may be equipped with any convenient means for securing a jaw, such as the jaw J indicated in broken lines in FIGURE 2, thereto. Here, for example, the front face 78 contains a central longitudinal groove 81 (FIGURE 5) which has three threaded holes 83 distributed therealong and is crossed by a further groove 82.

The radially inner face 84 of the body portion 72 of each chuck carrier 71 (FIGURES 2, 5 and 7) may be at any desired acute angle, here about 15 degrees, to the central axis of the chuck 10. Hence, the radially inner face 84 of the body portion 72 is, in this embodiment, at an angle of about 75 degrees to the riding face 74. The body portion 72 has an elongated extension 86 of generally T-shaped cross section extending radially inwardly from and preferably integral with its radially inner face 84. The extension 86 includes a crosshead 87 spaced from and held parallel to the radially inner face 84 by a neck 88. The radially inner longitudinal edges of the crosshead 87 are preferably beveled at 89 whereby inward movement of the several jaw carriers 71 will be limited by contact between the front ends of the bevels 89 thereof. The bevels 89 are preferably chamfered along their front edges as indicated at 91 whereby contact between said bevels 89 will be made over a nonzero area.

Figure 8:
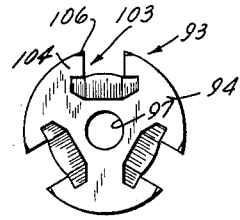
FIGURE 8 is a front elevational view of the drive member of the chuck of FIGURE 1.

The chuck 10 includes a generally cylindrical drive member 93 (FIGURES 2, 4 and 8) snugly contained within and slidable along the central opening 51 and central recess 52. The drive member 93 includes a wedging head 94 defining the front end thereof and radially contacting and slidable in the central opening 51 and recess 52. The drive member 93 has a hub 96 of reduced diameter which is preferably integral with the wedging head 94 and extends rearwardly therefrom. The drive member 93 has a central passage 97 therethrough which is preferably the diameter of the opening 53 in the front plate 13 for forming a continuation thereof. The drive member 93 further includes a rearwardly opening at least partially threaded recess 98 which is coaxial with and communicates with the central passage 97. The recess 98 is capable of receiving the head of a drawbar bolt 99 which is preferably of the socket-headed type. An externally threaded, headed sleeve 101 encircles the draw bolt 99 behind the head thereof and threadedly engages the rear portion of the recess 98 to secure the drawbar bolt 99 against radial and axial movement with respect to the drive member 93. Thus, axial movement of the drawbar bolt 99 moves the drive member 93 axially within the chuck body 11. The drawbar bolt 99 is threaded on its rearward end for engagement with a suitable drawbar (not shown). Access to the front end of the drawbar bolt 99 is provided through the central passage 97 and opening 53 so that the drawbar bolt 99 may be threaded into or out of its drawbar while the chuck 10 is mounted in its operative position on a lathe.

As an alternative to the afore-mentioned connection of the drawbar to the drive member 93, the drawbar bolt 99, sleeve 101 and recess 98 may be eliminated and the central passage 97 may be threaded to receive the threaded end of a suitable drawbar (not shown).

The wedging head 94 has a plurality, here three, of circumferentially spaced, radially outwardly opening keyways 103 therein. The keyways 103 are open at both axial ends thereof and are sloped with respect to the central axis of the chuck 10 at the same angle as the crossheads 87 of the installed jaw carriers 71. The keyways 103 closely conform in cross section to that of the extensions 86, said extensions 86 each being snugly but slidably receivable into one of the keyways 103. The jaw carriers 71 are prevented from radial movement away from the drive member 93 by interference of the crossheads 87 with shoulders 104 which partially define each of said keyways 103. Thus, axial movement of the drive member 93 will cause, through the keyways 103 and the extensions 86, movement of the jaw carriers 71 along their guideways 46. The forward circumferential edge of the wedging head 94 (FIGURES 4 and 8) is chamfered at 106 to allow passage therepast of the radially inner face 84 of the body portion 72.

Any convenient means may be employed for mounting the chuck 10 on a lathe (not shown). In this embodiment, such means include characteristics such as a relatively shallow, rearwardly opening, cylindrical recess 107 (FIGURE 4) in the back plate 12 with a plurality of radial, threaded openings 108 communicating between said recess 107 and the outer circumferential face of said back plate 12. Adjusting screws 109 threadedly engage the threaded openings 108. A plurality of spaced, preferably countersunk holes 111 pass through the front plate 13 and back plate 12, through the stepped surfaces 22 and 32, respectively, thereon and into the recess 107. United States Patent No. 2,639,157 discloses means for mounting a chuck on a lathe including the above-mentioned characteristics and such means need no further discussion here.

Operation

Although the operation of the chuck 10 embodying the invention has been disclosed somewhat hereinabove, the operation will be discussed in detail hereinbelow to assist a more complete understanding of the invention. The chuck 10 embodying the invention may be mounted upon the drive spindle of a lathe by any convenient means here shown as including the adjusting screws 109, holes 111 and recess 107. The drawbar bolt 99 may be fixed to the lathe drawbar (not shown) by rotating the bolt 99 with a suitable tool inserted through the openings 53 and 97 and engaging the head of said drawbar bolt 99. Chuck jaws of any desired type and such as the jaws J may be mounted upon the jaw carriers 71 by means such as the threaded holes 83 and grooves 81 and 82. When the carriers 71 are equipped with jaws J a workpiece, such as the workpiece W indicated in broken lines in FIGURE 2, may be grasped by said jaws J upon rearward movement of the drawbar bolt 99 from its position of FIGURE 2 toward its position of FIGURE 3. Said rearward movement of the drawbar bolt 99 moves the drive member 93 rearwardly which, through the keyways 103 and extensions 86 causes the jaw carriers 71 and jaws J carried thereby to move radially inwardly and axially rearwardly along the longitudinal axes of the guide flanges 73. Thus, the jaw carriers 71 move their jaws J radially into contact with the workpiece W and at the same time move the workpiece W axially rearwardly into contact with the front face of the front plate 13 or with suitable means (not shown) connected thereto. Linear motion of the jaw carriers 71 is maintained by the guide flanges 73 and guideways 46 assisted at the inner end of the jaw carriers 71 by the supplementary guide surfaces 77 bearing upon the chamfered surfaces 56. A workpiece W thus forced against the front face of the chuck 10 will frictionally engage same to inhibit rotation of the workpiece W with respect to the chuck 10. Therefore, the chuck 10 can, for a given radial force exerted on the workpiece W, apply greater torques to said workpiece W than can a conventional chuck. Alternatively, the chuck 10 can exert a conventional torque load but with considerably less radial gripping force on the workpiece W for reducing the possibility of workpiece distortion or damage.

Since the inward movement of the jaw carriers 71 has a component in the corresponding direction of drawbar movement, less drawbar pull is required to move the jaw carriers 71 inwardly than would be required by conventional, i.e., strictly radially, moving jaws. Actually, a given drawbar pull will produce a lesser compressive force between the jaw carriers 71 and its supporting surfaces in the chuck body 11 than would be produced in a comparable conventional chuck having radially moving jaws. Since shear friction at an interface depends on the compressive force across the interface, friction between the jaw carriers 71 and the chuck body 11 and as a result friction between the extension 86 and keyway 103 should be reduced by the sloped jaw carrier path in the chuck 10. Measurements have indicated the reduction in friction to be at least 15 percent over comparable conventional chucks.

The path traveled by the jaw carriers 71, being at an acute angle with the chuck axis, is longer than the radial jaw carrier path in a comparable conventional chuck. Hence, the length of a guideway 46 supporting a jaw carrier 71 may be increased for better support and guidance.

The sloped position of each jaw carrier 71 and its supporting guideway 46 places the radially inner end of the guide flanges 73 farther rearwardly than usual which allows an axially longer extension 86 than would normally be the case in a conventional radial jaw chuck. Because of this increased length the extension 86 will fill the lengthwise extent of the keyway 103 at all points in the travel of the drive member 93. Complete occupancy of the keyway 103 maintains a reduced unit pressure between the extension 86 and keyway 103 for given drawbar pull. More importantly, when the jaw carrier 71 is in its inwardmost position, there will be greater contact area between the extension 86 and the keyway 103 than in conventional chucks.

Release of a workpiece held by the chuck 10 is usually accomplished by a forward motion of the drawbar bolt 99 which moves the jaw carriers 71 outwardly and away from the workpiece.

As previously mentioned, the jaw carriers 71 bear against each other to limit inward motion thereof. In conventional chucks, inward motion of the jaw carriers is usually limited by means fixed with respect to the front plate, which means may not be uniform or symmetrical thereby allowing one jaw carrier to be stopped before another, a condition conducive to internal breakage due to excessive pressures on the first stopped of the jaw carriers. At their innermost limits of travel, the jaw carriers 71 extend radially inwardly more closely to the chuck axis than in conventional chucks. For this reason, the drawbar bolt 99 has been displaced axially rearwardly from its normal location to conventional chucks. This rearward location has been made possible by provision of the hub 96 on the drive member 93. The particular construction including the sleeve 101, recess 98 and drawbar bolt 99, as well as the central passage 97 and opening 53, makes possible conventional access to the drawbar bolt 99 despite the rearward placement of the drawbar bolt whereby operators experienced with conventional chucks need not be retrained in operation of the chuck 10 relating to the drawbar bolt 99. The drawbar bolt 99 may be rotated with respect to its drawbar (not shown) to adjust for deficiencies in drawbar length, said drawbar bolt being locked by the sleeve 101.

Although a particular preferred embodiment of the invention has been disclosed hereinabove for purposes of illustration, variations or modifications of such disclosure lying within the scope of the appended claims, are fully contemplated.

What is claimed is:

1. In a jaw chuck construction for gripping a workpiece, the combination comprising:

a generally cylindrical, radially extended chuck body having a peripheral wall and a forward wall;

a rearwardly opening central recess in said chuck body, the forward end of said recess being closed by said forward wall;

three equally circumferentially spaced guideways in said chuck body extending from said recess radially outwardly through said peripheral wall, said guideways opening through said forward wall between said peripheral wall and a point spaced from the center of said forward wall, said guideways including guiding surfaces extending at a small forward angle to the radial from said recess;

jaw members reciprocable in corresponding ones of said guideways and including jaws extending forwardly of said chuck body for gripping a workpiece located in front of said chuck body, the inner end of each said jaw member bearing slideably against said forward wall at the inner end of said guideway to prevent forward rocking thereof;

a drive member axially reciprocable in said recess and having a substantially axially extending undercut groove therein opposite each of said jaw members, said grooves diverging rearwardly from the chuck axis at an angle approximately the same as said small forward angle, the inner end of said jaw members each including means engageable in and reciprocable along said undercut grooves so that rearward movement of said drive member with respect to said jaw members causes inward movement of said jaw members along said guideways.

2. A jaw chuck, comprising the combination:

a cylindrical front body part having a coaxial plurality of radially diminishing, cylindrical steps extending rearwardly therefrom, said front body part also including a rearwardly opening central recess and a plurality of axial slots extending from said recess through the periphery of said front body part, said steps being beveled adjacent said slots at an angle of about 60° to the chuck axis, the central portion of said forward part being chamfered at the inner ends of said slots in parallelism with said beveled portions;

a cylindrical rear body part having a stepped series of cylindrical recesses for snugly coaxially receiving said steps, said rear body part having radial grooves axially aligned with said slots and paralleling and opposing said beveled portions;

means for fastening said front and rear parts in axially abutting relationship;

a plurality of jaw carriers slideably disposed snugly between said chamfered surface and said groove in said slots for reciprocating along said grooves, said jaw carriers having flanges disposed between said beveled portions and the opposed surface of said grooves, said jaw carriers including undercut extensions on the inner ends thereof;

a drive head reciprocably disposed in said recsss and a plurality of undercut keyways in said drive head, said keyways diverging rearwardly and slideably receiving said extensions therein for causing inward movement of said jaw carriers in response to rearward movement of said drive head;

abutment surfaces on said extensions engageable with each other to limit inward movement of said carriers;

jaws on the forward faces of said carriers extending forwardly of said body parts for gripping a workpiece located in front of said chuck and simultaneously urging same rearwardly against the center of said front body part.

3. In a slant jaw chuck construction for gripping a workpiece, the combination comprising:

a generally cylindrical, radially extended chuck body having a peripheral wall and a forward wall;

a rearwardly opening central recess in said chuck body, the forward end of said recess being closed by said forward wall;

three equally circumferentially spaced guideways in said chuck body extending from said recess radially outwardly through said peripheral wall, said guideways opening through said forward wall between said peripheral wall and a point spaced from the center of said forward wall, said guideways including front and rear guide surfaces extending at a small forward angle to the radial from said recess, said front guide surfaces being parallel with and directly opposed to portions of the rear guide surfaces;

jaw members reciprocable in corresponding ones of said guideways and including jaws extending forwardly of said chuck body for gripping a workpiece, the inner end of each said jaw member bearing slideably against said forward wall at the inner end of said guideway to prevent forward rocking thereof;

a drive member axially reciprocable in said recess and having a substantially axially extending undercut groove therein opposite each of said jaw members, said grooves diverging rearwardly from the chuck axis at an angle approximately the same as said small forward angle, the inner end of said jaw members each including means engageable in and reciprocable along said undercut grooves so that rearward movement of said drive member with respect to said jaw members causes inward movement of said jaw members along said guideways.

4. The device defined in claim 3 in which said guideways extend from near the rearward end of said chuck radially outwardly to locations near the forward end of said chuck; and said jaw means each include on the inner end thereof an undercut extension diverging rearwardly from the chuck axis at a small acute angle and extending from a point near the front of the chuck to a point near the rear of the chuck.

5. The device defined in claim 3 in which:

said chuck body has a forward portion and a coaxial rearward portion normally axially abutting same and means for releasably connecting said portions, the forward end of said rearward portion being recessed, the diameter of said recess increasing forwardly, the rearward end of the forward portion corresponding to the shape of said recess;

said guideways include a plurality of circumferentially spaced, radially extending slots in said forward portion;

means defining a radially outwardly and forwardly extending groove in at least one of said rearward and forward ends in registry with each of said slots and of circumferential width greater than said slots;

said jaw members include means reciprocably disposed in the corresponding ones of said grooves for allowing reciprocation of said jaw members along said grooves and for preventing movement of said jaw members transversely of said grooves.

6. The device defined in claim 3 in which:

said chuck body includes axially abutting, separable front and back portions, the rear end of the front portion diminishing in cross section rearwardly and the front end of the rear portion being depressed to correspond to said rear end;

said guideways in said chuck body extend along said abutting front and rear ends, at least a portion of said jaw members being sandwiched between said front and rear ends to prevent movement of said jaw members transversely of said guideways.

7. The chuck construction defined in claim 6 in which the rearward end of said forward portion carries a coaxial series of substantially cylindrical steps which diminish in diameter toward the rear of said forward portion and said recess is similarly stepped so that parts of said recess snugly telescope corresponding ones of said steps.

8. The device defined in claim 3 including a radial passage extending from the periphery of said chuck body into communication with each said guideway intermediate the ends thereof for providing lubricant thereto.

9. The chuck construction defined in claim 3 including a circumferentially spaced pair of abutment faces on the inner end of each of said jaw members, each of said abutment faces being opposed and parallel to an abutment face on the adjacent jaw member so that inward movement of said jaw members past a predetermined limit is prevented by interference between opposed ones of said abutment surfaces.

References Cited by the Examiner

UNITED STATES PATENTS

| 210,875 | 12/1878 | Pierce | 279—62 |
| 1,034,419 | 8/1912 | Catucci | 279—60 |
| 1,503,809 | 8/1924 | Schulz | 279—121 |
| 1,862,216 | 6/1932 | Garno | 279—119 |
| 1,879,656 | 9/1932 | Brown | 279—60 |
| 2,353,371 | 7/1944 | Seme | 279—64 |
| 2,679,612 | 12/1954 | Sloan | 279—121 |

FOREIGN PATENTS

| 140,884 | 4/1920 | Great Britain. |

ROBERT C. RIORDON, *Primary Examiner.*

H. V. STAHLHUTH, *Assistant Examiner.*